United States Patent
Tamamura (10) Patent No.: US 6,270,264 B1
(45) Date of Patent: *Aug. 7, 2001

(54) CAMERA WITH FILM CARTRIDGE ALIGNMENT FEATURE

(75) Inventor: Hideo Tamamura, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/474,182

(22) Filed: Jun. 7, 1995

Related U.S. Application Data (63) Continuation of application No. 08/230,877, filed on Apr. 20, 1994, now abandoned, which is a continuation of application No. 07/802,402, filed on Dec. 4, 1991, now abandoned.

(30) Foreign Application Priority Data

Jan. 7, 1991 (JP) .................................................. 3-000224

(51) Int. Cl.⁷ .............................. G03B 1/00; G03B 17/02
(52) U.S. Cl. ............................................ 396/411; 396/538
(58) Field of Search ...................................... 354/174, 175, 354/275, 288, 76, 106; 396/387, 411, 439, 535, 538, 310, 319

(56) References Cited

U.S. PATENT DOCUMENTS

| 4,647,170 | * | 3/1987 | Stoneham ......................... 354/288 X |
| 4,864,332 | | 9/1989 | Harvey ................................... 354/21 |
| 4,870,437 | | 9/1989 | Omaki et al. ........................... 354/64 |
| 5,005,031 | * | 4/1991 | Kelbe ................................. 354/76 X |
| 5,016,030 | * | 5/1991 | Dwyer et al. ...................... 354/76 X |

FOREIGN PATENT DOCUMENTS 2-067538   3/1990   (JP) .

\* cited by examiner

Primary Examiner—David M. Gray
(74) Attorney, Agent, or Firm—Fitzpatrick, Cella, Harper & Scinto

(57) ABSTRACT

A camera has a cartridge setting chamber in which a film cartridge is set. A fork is rotatably disposed in the cartridge setting chamber and is engagable with a rotary shaft of the film cartridge to feed a film in the film cartridge. A cartridge support member is provided in the cartridge setting chamber in a position opposite to that of the fork and engagable with the rotary shaft of the film cartridge. Consequently the film cartridge is pinched between the cartridge support member and the fork.

58 Claims, 7 Drawing Sheets

CAMERA WITH FILM CARTRIDGE ALIGNMENT FEATURE

This application is a continuation of prior application Ser. No. 08/230,877 filed on Apr. 20, 1994, which is a continuation of application Ser. No. 07/802,402 filed on Dec. 4, 1991, both now abandoned.

BACKGROUND OF THE INVENTION

1. Field of the Invention

This invention relates to a camera and, more particularly, to an improvement in a film transport device for maintaining the alignment of a film cartridge.

2. Description of the Prior Art

Recently, a type of camera has been proposed in U.S. Pat. No. 4,864,332 in which a film having a magnetic memory portion is used and information such as, a shutter speed, an aperture value, and a title are written on or read from this magnetic memory portion by a magnetic head.

Also, a pre-wind type of camera has been proposed and manufactured as an article of commerce in which the film is first wound around a spool and is then rewound into the film cartridge each time a frame is exposed. If the pre-wind type of camera is provided with a magnetic head and the film having a magnetic memory portion mentioned above, the following problem arises.

In order to write information on the magnetic memory portion of the film or reading out information therefrom, it is necessary to feed the film at a constant and a high speed.

The reason why feeding the film at a constant speed is necessary is because in a case where signals are read by the magnetic head as changes in the magnetism of the magnetic memory portion occur, the intervals of the signals are recognized as the content of information stored on the magnetic memory portion. Thus, a change in the film feed speed causes a change in the intervals of the signals, resulting in a detection failure.

The reason why feeding the film at a high speed is necessary is that unless the film is fed at a high speed, the magnetic flux will change so little so that the desired accuracy of the signals cannot be obtained.

Information may be written on or read from the magnetic memory portion of the film while the film is being rewound in the film cartridge. During this operation, if the film cartridge is inclined relative to the axis of a film rewinding fork, a shaft of the film cartridge and the film rewinding fork cannot be smoothly engaged and the load imposed on the film rewinding fork fluctuates. The film rewinding speed is thereby changed, resulting in an error in writing or reading information with the magnetic head.

Figure 7:
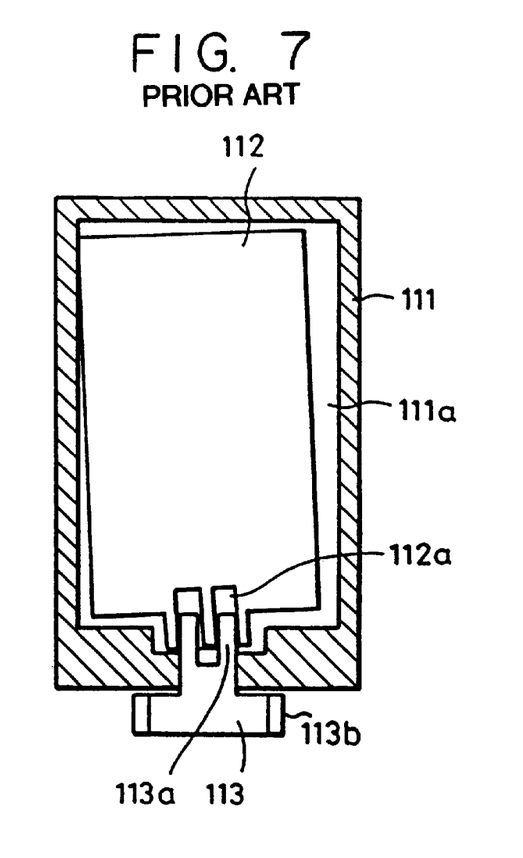
FIG. 7 is a longitudinal sectional view of a film cartridge chamber relating to the problem of the conventional camera.

This problem will be explained below with reference to FIGS. 7, 8 and 9. FIG. 7 is a longitudinal sectional view of a film cartridge chamber 111a in which a film cartridge 112 is accommodated in a camera body 111. Film cartridge 112 has a portion 112a for engagement with a fork portion 113a of a film rewinding fork 113 to which a fork drive gear 113b is connected.

Generally, the film cartridge size varies within the tolerance limit, and film cartridge chamber 111a has a size slightly larger than the film cartridge size so as to receive a film cartridge 112 in any shape. Ordinarily, for this reason, film cartridge 112 is set in film cartridge chamber 111a comparatively loosely so as to be off-centered relative to film cartridge chamber 111a at its one end while being engaged at the other end with the film rewinding fork portion 113a.

Figure 8:
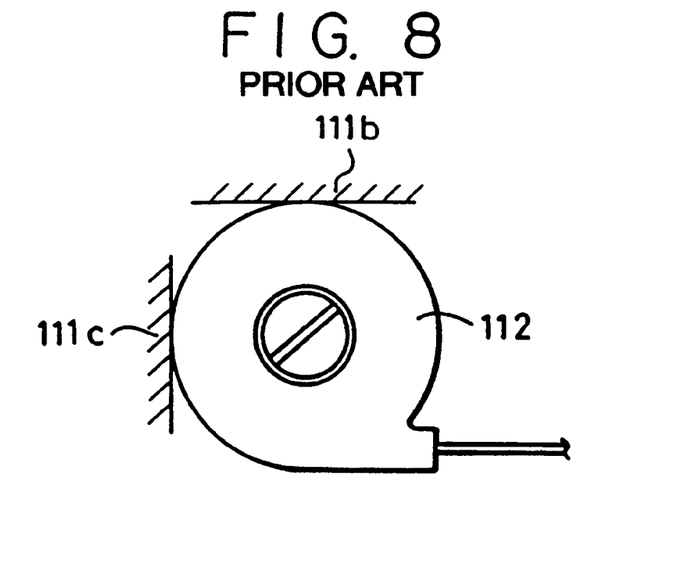
FIG. 8 is a plan view of the film cartridge chamber relating to the problem of the conventional camera.
Figure 9:
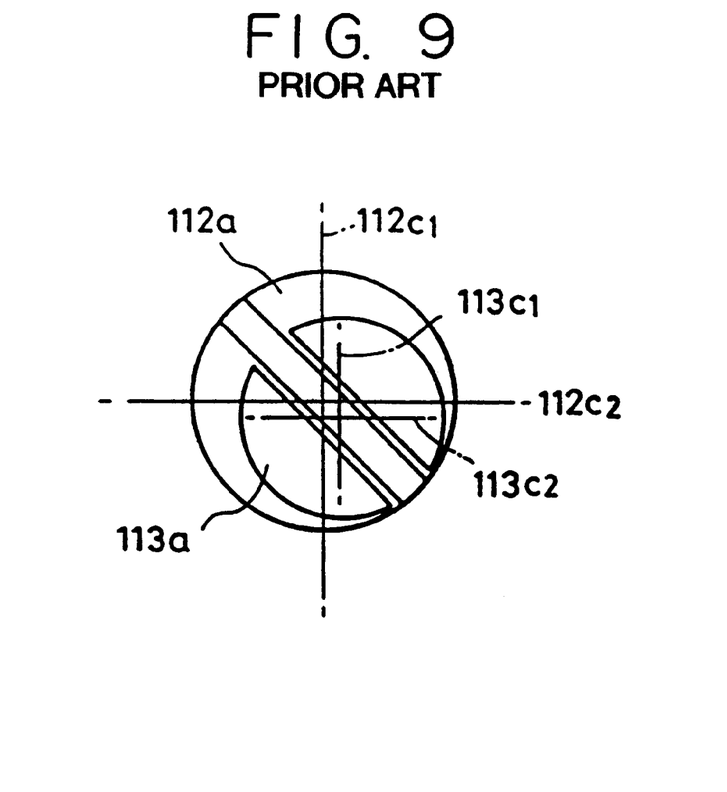
FIG. 9 is a plan view of the film cartridge chamber relating to the problem of the conventional camera.

A spring member (not shown) or the like may therefore be used to press film cartridge 112 on the surfaces of portions 111b and 111c of the film cartridge 112, to prevent play between the film cartridge 112 and the camera body surfaces 111b and 111c, as shown in FIG. 8. However, as shown in FIG. 9, in the case of the ordinary film cartridge, the center defined by center lines $113C_1$ and $113C_2$ of the film rewinding fork, i.e., the axis of the film rewinding fork and the center defined by center lines $112C_1$ and $112C_2$ of the film cartridge, i.e., the axis of the film cartridge deviate from each other, since the axial center position of the film rewinding fork in the film cartridge chamber is determined so that a film cartridge having a maximum size can be suitably received as mentioned above. Therefore, the film rewinding fork cannot be driven smoothly and the film rewinding speed is changed.

SUMMARY OF THE INVENTION

In view of these circumstances, an object of the present invention is to provide a camera comprising a cartridge setting chamber in which a film cartridge is set, a fork rotatably disposed in the cartridge setting chamber and engagable with a rotary shaft of the film cartridge to feed a film in the film cartridge, and a cartridge support member provided in the cartridge setting chamber in a position opposite to that of the fork and engagable with the rotary shaft of the film cartridge, the rotary shaft of the film cartridge being pinched between the cartridge support member and the fork, wherein the film cartridge can be prevented from being inclined during film feeding, so that a constant film feeding speed can be maintained.

The invention in another aspect pertains to a camera comprising a cartridge setting area in which a film cartridge is set, film feed means for feeding a film in the film cartridge set in the cartridge setting area, and cartridge pinching area means for pinching, with the film feed means, a rotary shaft of the film cartridge set in the cartridge setting area.

The invention in a further aspect pertains to a film cartridge loader for use in a camera comprising a cartridge setting chamber in which a film cartridge is set, a fork rotatably disposed in the cartridge setting chamber, the fork engaging with a rotary shaft of the film cartridge to feed a film in the film cartridge, and a cartridge support member provided in said cartridge setting chamber in a position opposite to that of the fork, the cartridge support member engaging with the rotary shaft of the film cartridge, the rotary shaft of the film cartridge being pinched between said cartridge support member and the fork.

The invention in yet another aspect pertains to a film cartridge loader for use in a camera comprising a cartridge setting area in which a film cartridge is set, film feed means for feeding a film in the film cartridge set in the cartridge setting area, and cartridge pinching means for pinching, with the film feed means, a rotary shaft of the film cartridge set in the cartridge setting area.

Other objects of the present invention will become apparent from the following description of preferred embodiments of the present invention.

DESCRIPTION OF THE PREFERRED EMBODIMENTS

Preferred embodiments of the present invention will be described below with reference to the accompanying drawings.

Figure 2:
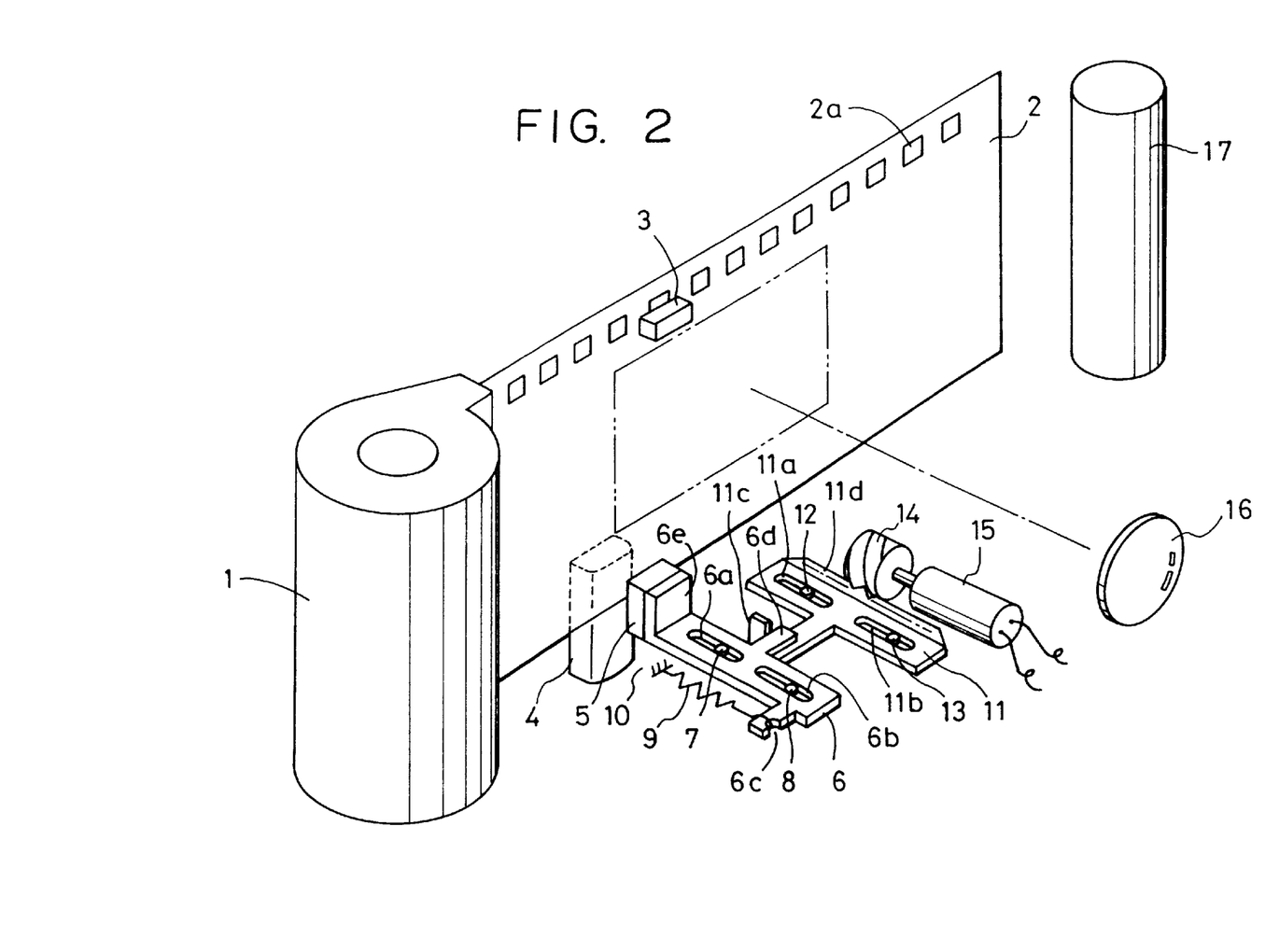
FIG. 2 is a perspective view of the construction of essential components of the camera in accordance with the first embodiment of the present invention.

FIG. 2 is a perspective view of the construction of essential components of a camera in accordance with an embodiment of the present invention. In a film cartridge 1 shown in FIG. 2 is accommodated the whole of a film 2 having a strip of a magnetic memory portion (not shown) extending along its lower end and perforation holes 2a (before automatic loading is started). Film cartridge 1 is inserted into a later-described film cartridge chamber formed as a cartridge loading chamber. That is, the whole of the film, including a film leader portion, is accommodated in the film cartridge when not used, and the film is fed out of the film cartridge when a film cartridge shaft is driven by a film feed fork after setting the film cartridge in the camera body of the camera and closing the camera back. This film cartridge is constructed as described in Japanese Patent Laid-Open Publication HEI No.2-67538. A photoreflector 3 is disposed in a position so as to face a path through which perforation holes 2a of film 2 move. Photoreflector 3 serves to detect a film feed condition. A magnetic head 4 is used to read information (e.g., ISO information, film frame number information) written on the magnetic memory portion of film 2 or to write information on this magnetic memory portion. Magnetic head 4 is fixed to an unillustrated pressure plate or the like. A film pressing pad 5 formed of an elastic material such as rubber serves to press the magnetic memory portion of film 2 on magnetic head 4. The surface of film pressing pad 5 brought into contact with film 2 is formed to be smooth so as to optimize sliding on film 2. A lever 6 is provided which has an upright bent portion 6e for supporting film pressing pad 5. Other portions of lever 6 have elongated holes 6a and 6b that are slidably fitted around pins 7 and 8, respectively, provided on the main body side. Further, lever 6 includes projecting portions 6c and 6d. One end of a spring 9 is hooked onto projecting portion 6c, and the other end of spring 9 is attached to a structural member on the camera body side, thereby constantly urging lever 6 toward the surface of film 2.

A lever 11 is provided having portions in which elongated holes 11a and 11b are slidably fitted around pins 12 and 13, respectively, provided on the camera body side. A projecting portion 11c which contacts projecting portion 6d of lever 6, and a rack portion 11d which meshes with a worm gear 14.

Worm gear 14 is fixed to an output shaft of a motor 15 to transmit the output therefrom to lever 11. When motor 15 rotates in a normal direction, film pressing pad 5 is moved to the film 2 surface through levers 11 and 6. An imaging lens 16 and a spool 17 for winding the film are provided.

Figure 1:
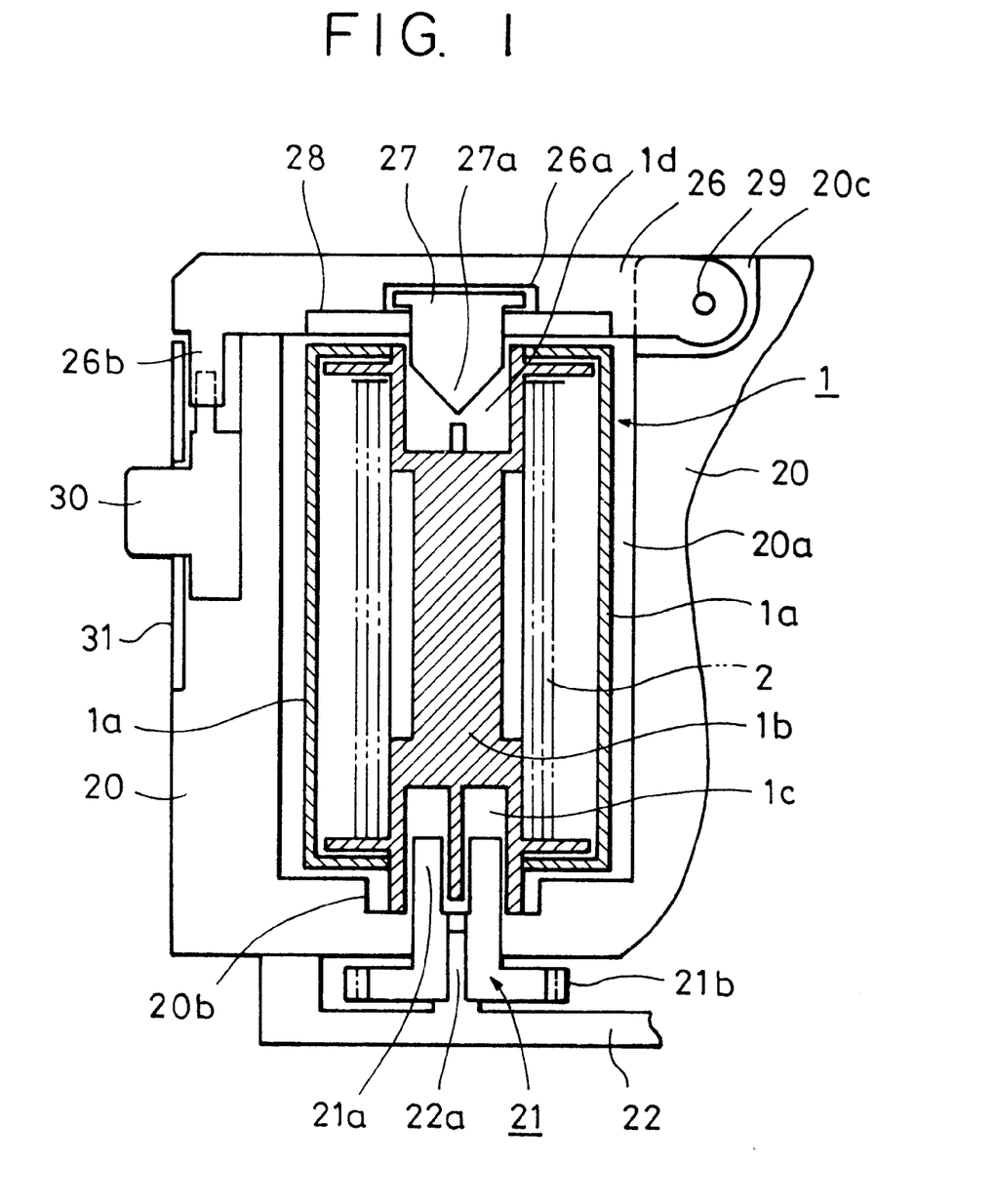
FIG. 1 is a longitudinal sectional view of a film cartridge chamber portion of a camera in accordance with an embodiment of the present invention.
Figure 3:
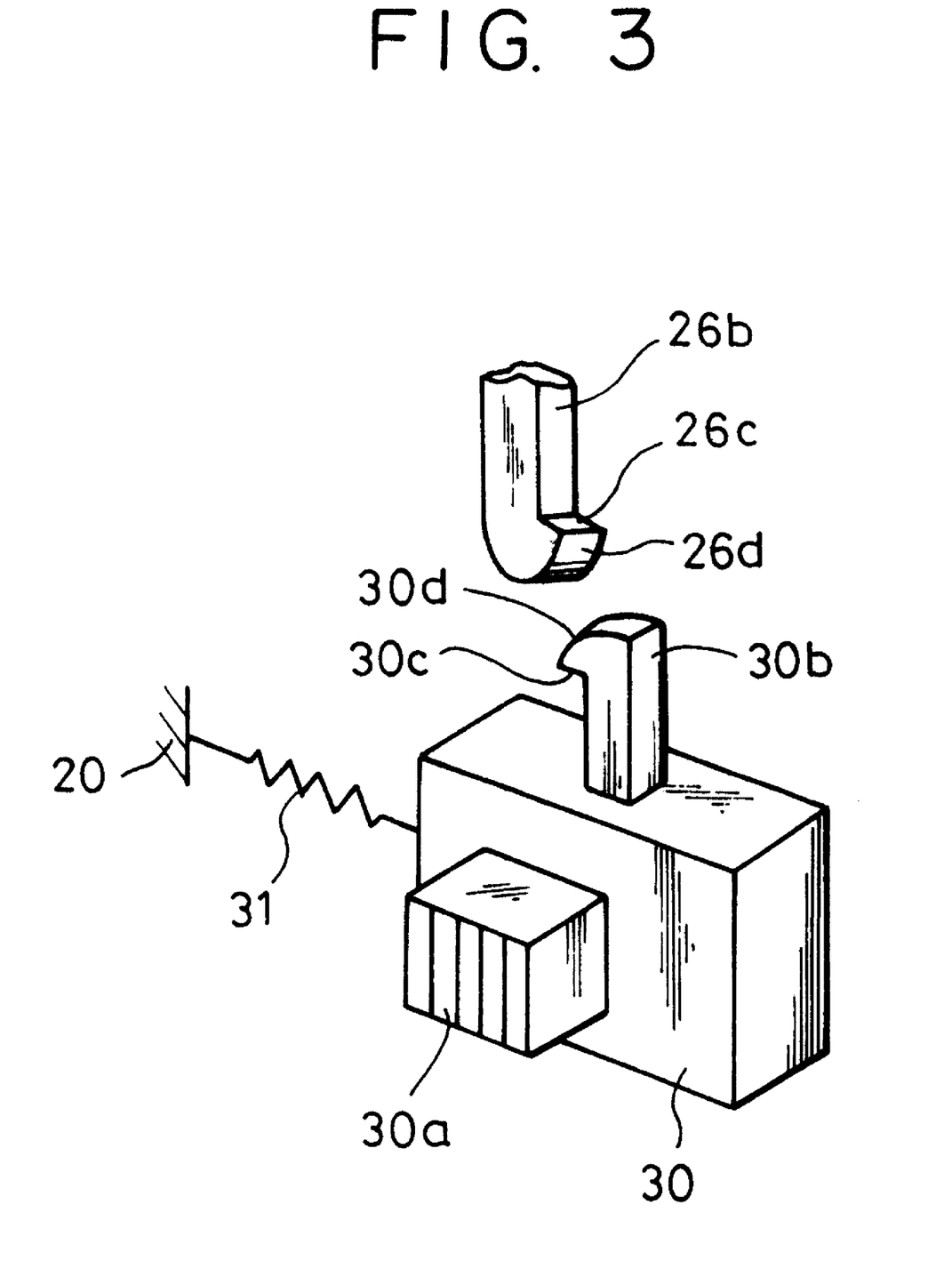
FIG. 3 is a perspective view of a mechanism for engagement with a cover for the film cartridge chamber shown in FIG. 1.

FIG. 1 is a longitudinal sectional view of a film cartridge chamber 20a in which film cartridge 1 shown in FIG. 1 is set. Camera body 20 has film cartridge chamber 20a in which film cartridge 1 is accommodated, a receiving portion 20b for receiving film cartridge 1 accommodated in film cartridge chamber 20a, and a recessed portion 20c in which a cover 26 described later is fitted. A film feed fork 21 is rotatably supported axially on a shaft 22a provided on a base plate 22. Film feed fork 21 has a fork portion 21a engagable with the film cartridge shaft, and a gear portion 21b to which a driving force is transmitted from a later-mentioned motor 110. Film cartridge 1 has a casing 1a in which are formed upper and lower holes in which film cartridge shaft 1b is rotatably fitted. Film cartridge shaft 1b has at its lower end a portion 1c for engagement with fork 21 and at its upper end a recess 1d. Film 2 is accommodated in film cartridge 1. A cover 26 is opened to enable film cartridge 1 to be inserted into or removed from film cartridge chamber 20a. Cover 26 is rotatably supported axially on a shaft 29 to open/close film cartridge chamber 20a. With reference to FIG. 3, cover 26 has a claw portion 26b. A tapered portion 26d and a locking portion 26c are provided at the extreme end of the claw portion 26b. An engagement member 30 has a finger operation portion 30a for sliding by an operator's finger to the left or right as viewed in FIG. 3, a claw portion 30b, a tapered portion 30d, and an engaging portion 30c for engagement with locking portion 26. Engagement member 30 is slidable laterally as viewed in FIG. 3 and is urged leftward in the engaging direction by a spring 31 to contact an unillustrated stopper. A retaining plate 31 shown in FIG. 1 retains engagement member 30 while allowing engagement member 30 to slide laterally relative to camera body 20 as viewed in FIG. 3.

A film cartridge support member 27 is fitted in recess 1d of film cartridge shaft 1b opposite to portion 1c for engagement with fork 21 so that film cartridge 1 is pinched between film cartridge support member 27 and fork 21 so as to be aligned and fixed generally perpendicularly in film cartridge chamber 20a. Film cartridge support member 27 is supported in a recess 26a of cover 26 by a retention plate 28 so as to be rotatable substantially coaxially with the axis of rotation of fork 21. Film cartridge support member 27 is fitted in recess 1d of film cartridge shaft 1b, when cover 26 is closed after film cartridge 1 has been set in film cartridge chamber 20a. At this time, even if film cartridge 1 set in film cartridge chamber 20a is initially inclined, film cartridge support member 27 can smoothly be fitted in recess 1d of film cartridge shaft 1b to align the same, because an end portion 27a of film cartridge support member 27 is tapered so as to have a conical shape. Since film cartridge support member 27 is rotatable, no load due to friction or the like between film cartridge shaft 1b and film cartridge support member 27 is caused when film cartridge shaft 1b is rotated.

Figure 4:
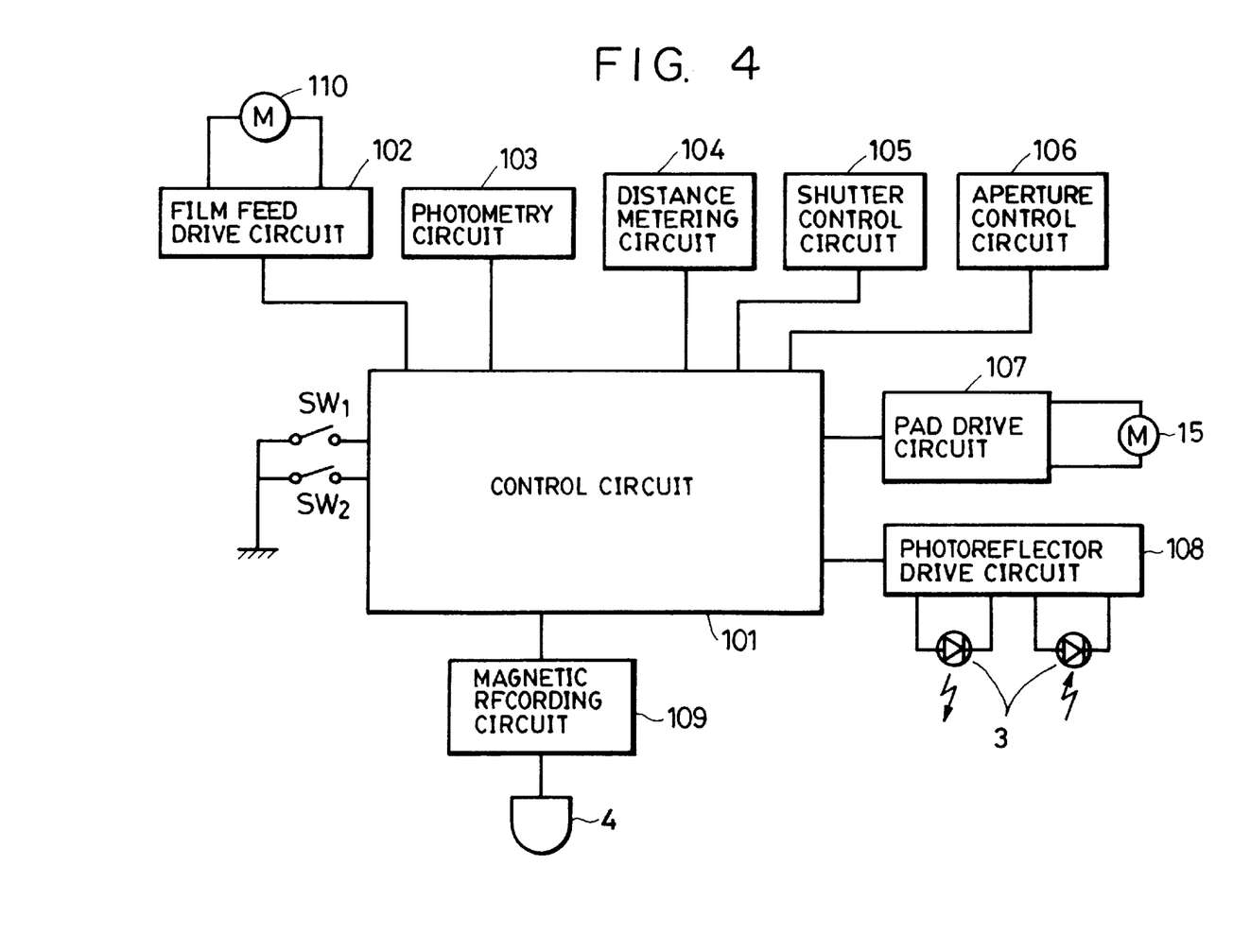
FIG. 4 is a circuit block diagram of the camera in accordance with the first embodiment of the present invention.

FIG. 4 is a block diagram of a circuit of the camera in accordance with this first embodiment of the present invention. This circuit includes a control circuit 101 constituted of a microcomputer or the like and operated for overall control of the camera, a film feed drive circuit 102 for driving a feed motor 110 for winding and rewinding the film, a photometry circuit 103, a distance metering circuit 104, a shutter control circuit 105, an aperture control circuit 106, a pad drive circuit 107 for controlling the driving of motor 15 to make levers 11 and 6 move film pressing pad 5 toward the film 2 surface i.e., to press the pad against the film or to move film pressing pad 5 away from the film 2 surface, a photoreflector drive circuit 108 for driving photoreflector 3 and counting the number of perforation holes 2a by photoreflector 3, and a magnetic recording circuit 109 for controlling magnetic head 4.

A switch SW1 is provided for starting photometry and distance metering, and switch SW2 is a release switch.

Figure 5:
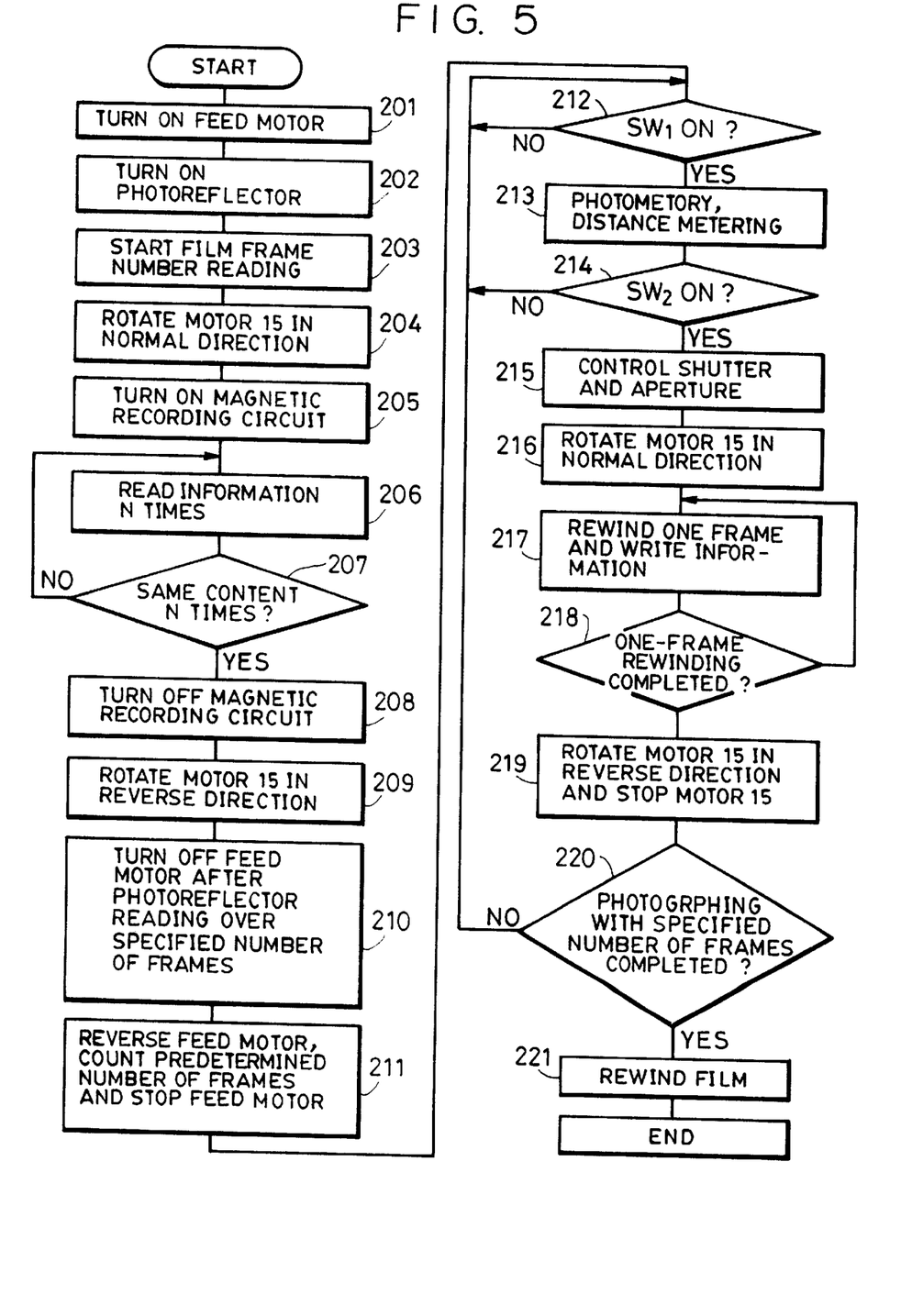
FIG. 5 is a flowchart of the operation of the circuit shown in FIG. 4.

The operation of above-described control circuit 101 now will be described below with reference to the flowchart of FIG. 5. First, engagement member 30 is moved to the right as viewed in FIG. 3 against the urging force of spring 31 to disengage engaging portion 31 from claw portion 26c of cover 26. Cover 26 is then rotated on shaft 29 clockwise as viewed in FIG. 1 to open film cartridge chamber 20a, and film cartridge 1 is set in film cartridge chamber 20a. Cover 26 is thereafter rotated on shaft 29 counterclockwise as viewed in FIG. 1 to close film cartridge chamber 20a. With the closing movement of cover 26, film cartridge support member 27 is fitted into recess 1d of film cartridge shaft 1b, and film cartridge 1 is thereby pinched between film cartridge support member 27 and fork 21 so as to be firmly fixed and generally vertically aligned.

When cover 26 is moved to the position at which the closing operation is completed, claw portion 26b of cover 26 temporarily forces, by its tapered portion 26d, a tapered portion 30d of engagement member 30 to the right as viewed in FIG. 3 against the urging force of spring 31, and engagement member 30 then returns to the left as viewed in FIG. 3 by the urging force of spring 31. Locking portion 26c of cover 26 is thereby locked with engaging portion 30c of engagement member 30, so that cover 26 is locked in the closed state.

[Step 201] When cover 26 is closed after film cartridge 1 has been set in film cartridge chamber 20a, control circuit 101 drives fork 21 by film feed drive circuit 102 and feed motor 110 so that film 2 is extruded from film cartridge 1 and fed toward spool 17. That is, a well-known automatic loading (AL) operation is started. At this time, film pressing pad 5 is in the retracted state and, therefore, the surface of extruded film 2 and magnetic head 4 are not in contact with each other.

[Step 202] Control circuit 101 drives photoreflector 3 through photoreflector drive circuit 108 while starting the AL operation.

[Step 203] ON and OFF signals supplied from photoreflector 3 during driving of photoreflector drive circuit 108 are counted. That is, detection of the number of frames of film 2 is started.

[Step 204] When a predetermined frame number is counted by photoreflector drive circuit 108, that is, when film 2 is wrapped around spool 17, motor 15 is driven (rotated in the normal direction) for a predetermined time through pad drive circuit 107.

As motor 15 rotates in the normal direction, lever 11 is moved toward the film 2 surface by worm gear 14 shown in FIG. 2. By this movement, lever 6 is released from the state of being stopped by projecting portion 11c of lever 11 and therefore moves toward the film 2 surface by the urging force of spring 9. Film pressing pad 5 fixed to upright bent portion 6e of lever 6 then presses the film 2 surface against magnetic head 4. The stroke through which lever 11 is moved at this time is set so as to be larger than that of the movement of lever 6. Needless to say, this stroke setting is intended to ensure that film pressing pad 5 suitably presses the film 2 surface against magnetic head 4.

[Step 205] Magnetic head 4 is driven through magnetic recording circuit 109.

[Step 206] Magnetic head 4 is driven to read information written on the magnetic memory portion of film 2 N times.

[Step 207] Determination is made as to whether the contents of information read by N time reading are the same.

If the information contents are the same, the process proceeds to step 208.

[Step 208] To stop information reading, driving magnetic head 4 is stopped through magnetic recording circuit 109.

[Step 209] Motor 15 is driven for a predetermined time through pad drive circuit 107. (At this time, the directions of energization and rotation are opposite to those in the case of step 204.)

As motor 15 rotates in the reverse direction, lever 11 is moved away from the film 2 surface by worm gear 14. With this movement, projecting portion 11c of lever 11 presses projecting portion 6d of lever 6, so that lever 6 is moved in the same direction against the urging force of spring 9. Film pressing pad 5 thereby retracts from the film 2 surface.

[Step 210] When a specified number of frames is detected by photoreflector drive circuit 108 which is continuing to detect the film feed condition, that is, when the film frame information read from the film 2 surface with magnetic head 4 indicates "36 frames", "the number of perforation holes corresponding to 36 frames+the number of perforation holes corresponding to the predetermined number of frames" is detected by photoreflector drive circuit 108, driving of feed motor 110 is stopped through film feed drive circuit 102.

[Step 211] Feed motor 110 is rotated in the reverse direction through film feed drive circuit 102 to the extent corresponding to the number of perforations of the predetermined number of frames over wound. When this operation is completed, driving of feed motor 110 is stopped again. At this time, the 36th frame of film 2 is correctly positioned at the aperture position.

[Step 212] Determination is made as to whether switch SW1 has been turned on. If the switch SW1 is on, the process proceeds to step 213.

[Step 213] Since switch SW1 is on, photometry circuit 103 and distance metering circuit 104 are operated to obtain photometry information and distance metering information.

[Step 214] Determination is made as to whether switch SW2 has been turned on. If the switch SW2 is on, the process proceeds to step 215.

[Step 215] Since switch SW2 is on, shutter control circuit 105 and aperture control circuit 106 are operated to effect well-known exposure control.

If one of the switches SW1 and SW2 is not on, the process returns to step 212.

[Step 216] Motor 15 is driven, i.e., rotated in the normal direction, to make the film pressing pad 5 move to the film 2 surface position and press against magnetic head 4.

[Step 217] Feed motor 110 is rotated in the reverse direction through film feed drive circuit 102 to make fork 21 start rewinding the frame used for photographing.

[Step 218] Determination is made as to whether photoreflector drive circuit 108 has confirmed that perforations corresponding to one frame has been detected through photoreflector 3. When the detection is confirmed, feed motor 110 is stopped. During this rewinding of one used frame, photographing information relating to this frame, e.g., the photographing date, is written on the magnetic memory portion of film 2 with magnetic head 4, and information is read from the magnetic memory portion.

During this operation, since film cartridge 1 is pinched between fork 21 and film cartridge support member 27, there is no possibility of film cartridge 1 being inclined to cause a change in the film 2 rewinding speed, and information can therefore be written and read out with accuracy.

[Step 219] Since information writing onto or reading from the used frame is completed, motor 15 is driven for a predetermined time through pad drive circuit 107 to make film pressing pad 5 retract from the film 2 surface.

[Step 220] Determination is made as to whether photographing for the specified number of frames has been completed. In the case of incompletion, the process returns to step 212 to repeat the same operations. When the completion of photographing for the specified number of frames is confirmed, the process proceeds to step 221.

[Step 221] Feed motor 110 is rotated in the reverse direction through film feed drive circuit 102 to rewind the remaining leader portion of film 2 in film cartridge 1. The process is thereby completed.

Figure 6:
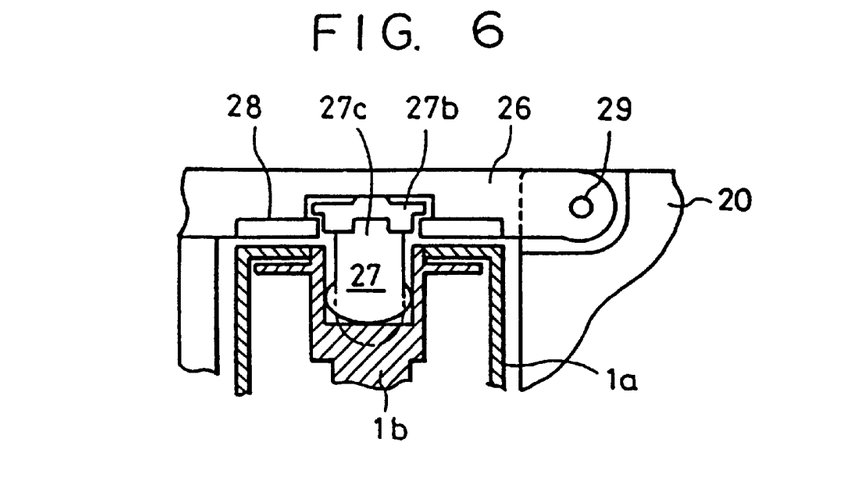
FIG. 6 is a longitudinal sectional view of essential components of a film cartridge chamber in accordance with another embodiment of the present invention.

FIG. 6 shows another embodiment of the present invention. In this embodiment, film cartridge support member 27 is constituted of an elastic material, e.g., a rubber-like material. However, because it is required that the support shaft be freely rotatable, film cartridge support member 27 is not entirely formed of an elastic material; its rotation portion 27b is formed as a rigid member while only its portion 27c fitted in recess 1d of film cartridge shaft 1b is formed as an elastic member, as shown in FIG. 6. The dot-dash line in FIG. 6 indicates a state of the elastic member 27c in which this member is not fitted in recess 1d of film cartridge shaft 1b, i.e., before it is deformed.

By this construction, film cartridge support member 27 can be adapted to various shapes and sizes of the recess of the film cartridge shaft.

The pre-wind type of camera using a film having a magnetic memory portion has been described with respect to the above embodiments. However, needless to say, the present invention can be applied to other types of cameras.

According to the present invention, as described above, during film feeding, even when the film is fed by the fork which drives the film cartridge shaft, the film cartridge can be prevented from being inclined, so that a constant film feeding speed can be maintained. It is therefore possible to write information on the magnetic memory portion of the film or read information from the magnetic memory portion with improved accuracy and to reduce writing and reading errors.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera adapted to use a thrust-type film cartridge including a film having an information memory portion, comprising:

a cartridge chamber in which a film cartridge is set;

an engaging portion which engages a film feeding portion of the film cartridge set in said cartridge chamber; and a support portion provided in said cartridge chamber at a position opposite said engaging portion, said support portion comprising a rotatable member engaging the film feeding portion of the film cartridge, the film feeding portion of the film cartridge being pinched between said support portion and said engaging portion.

2. A camera according to claim 1, further comprising means for elastically deforming said cartridge support member.

3. A camera according to claim 1, further comprising information transmission means for at least one of magnetically reading information from the memory portion of the film and magnetically writing information to the memory portion during transporting of the film, wherein said information transmission means comprises a magnetic head.

4. A camera according to claim 1, further comprising information transmission means for at least one of magnetically reading information from the memory portion of the film and magnetically writing information to the memory portion during transporting of the film, wherein said information transmission means comprises means for effecting operation during a period of time when the film is being rewound by said fork.

5. A camera according to claim 1, further comprising means for winding the film and thereafter rewinding the film each time a frame is exposed.

6. A camera according to claim 1, wherein said cartridge support member comprises an elastic member.

7. A camera according to claim 1, further comprising information transmission means for at least one of reading information on an information recording portion of the film and writing information on the information recording portion during feeding of the film.

8. A camera according to claim 1, further comprising information transmission means for at least one of reading and writing information on the film during feeding of the film.

9. A camera according to claim 8, wherein said information transmission means comprises a magnetic head.

10. A camera according to claim 8, wherein said information transmission means comprises means for effecting operation during a period of time when the film is rewound by said engaging portion.

11. A camera according to claim 7, further comprising means for winding the film and thereafter rewinding the film each time a frame is exposed.

12. A camera according to claim 8, further comprising means for winding the film and thereafter rewinding the film each time a frame is exposed.

13. A camera according to claim 1, wherein the film feeding portion is pinched and is held substantially coaxial with an axis of rotation of each of said support portion and said engaging portion.

14. A camera adapted to use a thrust-type film cartridge including a film having an information memory portion, comprising:

a cartridge setting area in which a film cartridge having a film movement portion is set;

a film driving portion which drives the film movement portion of the film cartridge set in said cartridge setting area; and a cartridge pinching portion which pinches, with said film driving portion, the film movement portion of the film cartridge set in said cartridge setting area, wherein said cartridge pinching portion comprises a rotatable member engageable with said film movement portion of the cartridge.

15. A camera according to claim 14, further comprising means for elastically deforming said cartridge pinching means.

16. A camera according to claim 14, further comprising information transmission means for at least one of magnetically reading information from the memory portion of the film and magnetically writing information to the memory portion during transporting of the film, wherein said information transmission means comprises a magnetic head.

17. A camera according to claim 14, further comprising information transmission means for at least one of magnetically reading information from the memory portion of the film and magnetically writing information to the memory portion during transporting of the film, wherein said information transmission means comprises means for effecting operation during a period of time when the film is being rewound by said film transportation means.

18. A camera according to claim 14, further comprising means for winding the film and thereafter rewinding the film each time a frame is exposed.

19. A camera according to claim 14, wherein said cartridge pinching means comprises an elastic member.

20. A camera according to claim 14, further comprising information transmission means for at least one of reading information on an information recording portion of the film and writing information on the information recording portion during feeding of the film.

21. A camera according to claim 14, further comprising information transmission means for at least one of reading and writing information on the film during feeding of the film.

22. A camera according to claim 21, wherein said information transmission means comprises a magnetic head.

23. A camera according to claim 21, wherein said information transmission means comprises means for effecting operation during a period of time when the film is being rewound by said film feed means.

24. A camera according to claim 20, further comprising means for winding the film and thereafter rewinding the film each time a frame is exposed.

25. A camera according to claim 21, further comprising means for winding the film and thereafter rewinding the film each time a frame is exposed.

26. A camera according to claim 14, wherein the film movement portion of the film cartridge is pinched and is held substantially coaxial with an axis of rotation of each of said cartridge pinching portion and said film driving portion.

27. A film cartridge loader for a camera adapted to use a thrust-type film cartridge including a film having an information memory portion, comprising:
a cartridge chamber in which a film cartridge is set;
an engaging portion which engages a film feeding portion of the film cartridge set in said cartridge chamber; and
a support portion provided in said cartridge chamber at a position opposite said engaging portion, said support portion comprising a rotatable member engaging the film feeding portion of the film cartridge, the film feeding portion of the film cartridge being pinched between said support portion and said engaging portion.

28. A film cartridge loader according to claim 27, further comprising means for elastically deforming said cartridge support member.

29. A film cartridge loader according to claim 27, further comprising information transmission means for at least one of magnetically reading information from the memory portion of the film and magnetically writing information to the memory portion during transporting of the film, wherein said information transmission means comprises a magnetic head.

30. A film cartridge loader according to claim 27, further comprising information transmission means for at least one of magnetically reading information from the memory portion of the film and magnetically writing information to the memory portion during transporting of the film, wherein said information transmission means comprises means for effecting operation during a period of time when the film is rewound by said fork.

31. A film cartridge loader according to claim 27, further comprising means for winding the film and thereafter rewinding the film each time a frame is exposed.

32. A film cartridge loader according to claim 27, wherein said cartridge support member comprises an elastic member.

33. A film cartridge loader according to claim 27, further comprising information transmission means for at least one of reading information on an information recording portion of the film and writing information on the information recording portion during feeding of the film.

34. A film cartridge loader according to claim 27, further comprising information transmission means for at least one of reading and writing information on the film during feeding of the film.

35. A film cartridge loader according to claim 34, wherein said information transmission means comprises a magnetic head.

36. A film cartridge loader according to claim 34, wherein said information transmission means comprises means for effecting operation during a period of time when the film is rewound by said engaging portion.

37. A film cartridge loader according to claim 33, further comprising means for winding the film and thereafter rewinding the film each time a frame is exposed.

38. A film cartridge loader according to claim 34, further comprising means for winding the film and thereafter rewinding the film each time a frame is exposed.

39. A film cartridge loader according to claim 27, wherein the film feeding portion is pinched and is held substantially coaxial with an axis of rotation of each of said support portion and said engaging portion.

40. A film cartridge loader for a camera adapted to use a thrust-type film cartridge including a film having an information memory portion, comprising:
a cartridge setting area in which a film cartridge having a film movement portion is set;
a film driving portion which drives the film movement portion of the film cartridge set in said cartridge setting area; and
a cartridge pinching portion which pinches, with said film driving portion, the film movement portion of the film cartridge set in said cartridge setting area, wherein said cartridge pinching portion comprises a rotatable member engageable with said film movement portion of the cartridge.

41. A film cartridge loader according to claim 40, further comprising means for elastically deforming said cartridge pinching means.

42. A film cartridge loader according to claim 40, further comprising information transmission means for at least one of magnetically reading information from the memory portion of the film and magnetically writing information to the memory portion during transporting of the film, wherein said information transmission means comprises a magnetic head.

43. A film cartridge loader according to claim 40, further comprising information transmission means for at least one of magnetically reading information from the memory portion of the film and magnetically writing information to the memory portion during transporting of the film, wherein said information transmission means comprises means for effecting operation during a period of time when the film is being rewound by said film transportation means.

44. A film cartridge loader according to claim 40, further comprising means for winding the film and thereafter rewinding the film each time a frame is exposed.

45. A film cartridge loader according to claim 40, wherein said cartridge pinching means comprises an elastic member.

46. A film cartridge loader according to claim 40, further comprising information transmission means for at least one of reading information on an information recording portion of the film and writing information on the information recording portion during feeding of the film.

47. A film cartridge loader according to claim 40, further comprising information transmission means for at least one of reading and writing information on the film during feeding of the film.

48. A film cartridge loader according to claim 47, wherein said information transmission means comprises a magnetic head.

49. A film cartridge loader according to claim 47, wherein said information transmission means comprises means for effecting operation during a period of time when the film is being rewound by said film feed means.

50. A film cartridge loader according to claim 46, further comprising means for winding the film and thereafter rewinding the film each time a frame is exposed.

51. A film cartridge loader according to claim 47, further comprising means for winding the film and thereafter rewinding the film each time a frame is exposed.

52. A film cartridge loader according to claim 40, wherein the film movement portion of the film cartridge is pinched and is held substantially coaxial with an axis of rotation of each of said cartridge pinching portion and said film driving portion.

53. A camera adapted to use a thrust-type film cartridge including a film having an information memory portion, comprising:
    a cartridge chamber in which a film cartridge is set;
    an engaging portion which engages a film feeding portion of the film cartridge set in said cartridge chamber; and
    a support portion provided in said cartridge chamber at a position opposite said engaging portion, said support portion engaging the film feeding portion of the film cartridge, the film feeding portion of the film cartridge being captured and aligned between said support portion and said engaging portion so that the film cartridge does not come into contact with a wall of said cartridge chamber.

54. A film cartridge loader for a camera adapted to use a thrust-type film cartridge including a film having an information memory portion, comprising:
    a cartridge chamber in which a film cartridge is set;
    an engaging portion which engages with a film feeding portion of the film cartridge set in said cartridge chamber; and
    a support portion provided in said cartridge chamber at a position opposite said engaging portion, said support portion engaging the film feeding portion of the film cartridge, the film feeding portion of the film cartridge being captured and aligned between said support portion and said engaging portion so that the film cartridge does not come into contact with a wall of said cartridge chamber.

55. A camera adapted to use a thrust-type film cartridge including a film having [a] an information memory portion, comprising:
    a cartridge chamber in which a film cartridge is set;
    engaging portion which engages a film feeding portion of the film cartridge set in said cartridge chamber; and
    a support portion provided in said cartridge chamber at a position opposite said engaging portion, said support portion engaging the film feeding portion of the film cartridge, the film feeding portion of the film cartridge being fixed and aligned between said support portion and said engaging portion.

56. A camera according to claim 55, wherein said engaging portion is disposed at a lower portion of said cartridge chamber, and said engaging portion drives the film feeding portion of a film cartridge set in said cartridge chamber.

57. A film cartridge loader for a camera adapted to use a thrust-type film cartridge including a film having an information memory portion, comprising:
    a cartridge chamber in which a film cartridge is set;
    an engaging portion which engages with a film feeding portion of the film cartridge set in said cartridge chamber; and
    a support portion provided in said cartridge chamber at a position opposite said engaging portion, said support portion engaging the film feeding portion of the film cartridge, the film feeding portion of the film cartridge being fixed and aligned between said support portion and said engaging portion.

58. A camera according to claim 57, wherein said engaging portion is disposed at a lower portion of said cartridge chamber, and said engaging portion drives the film feeding portion of a film cartridge set in said cartridge chamber.

* * * * *

UNITED STATES PATENT AND TRADEMARK OFFICE
CERTIFICATE OF CORRECTION

PATENT NO. : 6,270,264 B1
DATED : August 7, 2001
INVENTOR(S) : Hideo Tamamura

It is certified that error appears in the above-identified patent and that said Letters Patent is hereby corrected as shown below:

Drawings,
Sheet 4, Fig. 4, "RFCORDING" should read -- RECORDING --.
Sheet 5, Fig. 5, "PHOTOMETORY" should read -- PHOTOMETRY --; and
"PHOTOGRPHING" should read -- PHOTOGRAPHING --.

Column 4,
Line 20, "id." should read -- 1d. --.

Column 5,
Line 18, "20a:" should read -- 20a. --.

Column 12,
Line 17, "[a]" should be deleted;
Line 20, "engaging" should read -- an engaging --; and
Line 45, "camera" should read -- film cartridge loader --.

Signed and Sealed this

Ninth Day of April, 2002

Attest:

*Attesting Officer*

JAMES E. ROGAN
*Director of the United States Patent and Trademark Office*